US006426750B1

(12) United States Patent
Hoppe

(10) Patent No.: US 6,426,750 B1
(45) Date of Patent: *Jul. 30, 2002

(54) RUN-TIME GEOMORPHS

(75) Inventor: Hugues H. Hoppe, Seattle, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,572

(22) Filed: Jul. 14, 1998

(51) Int. Cl.$^7$ ................................................ G06T 17/00
(52) U.S. Cl. ...................... 345/428; 345/423; 345/473; 345/475
(58) Field of Search ................................ 345/423, 473, 345/475, 428

(56) References Cited

U.S. PATENT DOCUMENTS 5,883,629 A 3/1999 Johnson
6,009,435 A * 12/1999 Taubin et al. ................ 345/423

OTHER PUBLICATIONS

Foley et al., *Computer Graphics Principles and Practice*, Addison–Wesley Publishing Company, Inc., pp. 510–527, 1996.

Abi–Ezzi et al, "Fast Dynamic Tessellation of Trimmed NURBS Surfaces," *Eurographics* '94, 13:C107–C126 (1994).

Bertolotto et al., "Multiresolution Representation of Volume Data Through Hierarchical Simplicial Complexes," *Aspects of Visual Form Processing*, 73–82 (1994).

(List continued on next page.)

*Primary Examiner*—Mark Zimmerman
*Assistant Examiner*—Philip H. Stevenson
(74) *Attorney, Agent, or Firm*—Klarquist Sparkman, LLP

(57) ABSTRACT

Real-time rendering of large-scale surfaces with locally adapting surface geometric complexity according to changing view parameters. A view-dependent progressive mesh (VDPM) framework represents an arbitrary triangle mesh as a hierarchy of geometrically optimized refinement transformations, from which accurate approximating meshes can be efficiently retrieved. The VDPM framework provides temporal coherence through the run-time creation of geomorphs. These geomorphs eliminate "popping" artifacts by smoothly interpolating geometry. The geomorphs utilizes output-sensitive data structures to reduce memory requirements.

29 Claims, 8 Drawing Sheets

(1 of 8 Drawing Sheet(s) Filed in Color)

OTHER PUBLICATIONS

Bertolotto et al., "Pyramidal Simplicial Complexes," *Solid Modeling '95*, Department of Computer and Information Sciences, University Of Genova, 153–162 (1995).

Cignoni et al, "Representation and Visualization of Terrain Surfaces at Variable Resolution," *Scientific Visualization '95*, 50–68 (Sep. 1995).

Deering, "Geometry Compression," *Computer Graphics Proceedings*, Annual Conference Series, 13–20 (1995).

DeHaemer et al., "Simplification of Objects Rendered by Polygonal Approximations," *Computers & Graphics*, 15:2:175–184 (1991).

Eck et al., "Multiresolution Analysis of Arbitrary Meshes," *Computer Graphics Proceedings*, Annual Conference Series, 173–182 (1995).

Floriani et al, "Multiresolution Models for Topographic Surface Description,"*The Visual Computer*, 12:317–345, 1996.

Foley et al, "The Quest for Visual Realism," *Computer Graphics: Principles and Practice*, 14:605–647 (1991).

Funkhouser et al., "Adaptive Display Algorithm for Interactive Frame Rates During Visualization of Complex Virtual Environments," *Computer Graphics Proceedings*, Annual Conference Series, 247–254 (1993).

Gourdon, "Simplification of Irregular Surfaces Meshes in 3D Medical Images," *Computer Vision, Virtual Reality and Robotics in Medicine*, First International Conference, CVRMed '95, Nice, France, Proceedings, 413–419 (Apr. 3–6, 1995).

Gross et al., "Fast Multiresolution Surface Meshing," *Proceedings Visualization '95*, 135–142 (Oct./Nov. 1995).

Hamann, "A Data Reduction Scheme for Triangulated Surfaces," *Computer Aided Geometric Design* 11:197–214 (1994).

He et al., "Controlled Topology Simplification," *IEEE Transactions on Visualization and Computer Graphics*, 2:2:171–184 (1996).

He et al., "Voxel Based Object Simplification," *IEEE Visualization*, '95, 296–303, CP–35 (1995).

Heckbert et al., "Fast Polygonal Approximation of Terrains and Heigh Fields," CMU–CS–95–181, 1–54 (Aug. 1995).

Hinker et al., "Geometric Optimization," *IEEE Visualization*, '93, 189–195 (1993).

Hoppe et al., "Mesh Optimization," *Computer Graphics Proceedings*, Annual Conference Series, 19–26 (1993).

Hoppe, "Progressive Meshes," *Computer Graphics Proceedings, Annual Conference Series*, 99–108 (1996).

Kalvin et al., "Superfaces: Polyhedral Approximation with Bounded Error," SPIE, 2164:2–3 (1994).

Kirkpatrick, "Optimal Search in Planar Subdivisions," *Siam J. Comput.*, 12:28–35 (1983).

Kumar et al, "Hierarchical Visibility Culling for Spline Models," *Proceedings of Graphic Interface '96*, 142–150, (1996).

Kumar et al, "Interactive Display of Large–Scale NURBS Models," *Symposium on Interactive 3D Graphics*, 51–58 (1995).

Lindstrom et al, "Real–Time, Continuous Level of Detail Rendering of Height Fields," *Computer Graphics SIGGRAPH '96* (1996).

Mitchell et al., "Separation and Approximation of Polyhedral Objects," *Computer Aided Geometric Design*, 5:95–114 (1995).

Paoluzzi et al., "Dimension–Independent Modeling with Simplicial Complexes," *ACM Transactions on Graphics*, 12:1:56–102 (1993).

Rockwood et al, "Real–Time Rendering of Trimmed Surfaces," *Computer Graphics*, 23:108–116 (1989).

Rossignac et al., "Multi–Resolution 3D Approximations for Rendering Complex Scenes," *Modeling In Computer Graphics*, 455–465 (1993).

Rushmeier et al., "Geometric Simplification for Indirect Illumination Calculations," *Proceedings of Graphics Interface '93*, 227–236 (1993).

Scarlatos, "A Refined Triangulation Hierarchy for Multiple Levels of Terrain Detail," *Image V Conference*, 115–122 (Jun. 1990).

Schaufler et al., "Generating Multiple Levels of Detail for Polygonal Geometry Models," *Virtual Environments*, 54–62 (1995).

Schaufler et al., "Generating Multiple Levels of Detail from Polygonal Geometry Models," *Virtual Environments '95* (Eurographics Workshop On Virtual Environments), 33–41 (1995).

Schröder et al., "Spherical Wavelets," *Computer Graphics Proceedings*, Annual Conference Series, 161–172 (1995).

Schroeder et al., "Decimation of Triangle Meshes," *Computer Graphics*, 26:2:65–70 (Jul. 1992).

Shirman et al, "The Cone of Normals Technique for Fast Processing of Curved Patches," *Eurographics '93*, 12:C261–C272, (1993).

Spanier, "Algebraic Topology," University of California, Berkeley, Chapter 3, 107–153 (1966).

Taylor et al, "An Algorithm for Continuous Resolution Polygonalizations of a Discrete Surface," *Graphics Interface '94*, 33–42 (May 1994).

Turk, "Re–Tiling Polygonal Surfaces," *Computer Graphics*, 26:2:55–64 (Jul. 1992).

Varshney *Hierarchical Geometric Approximations*, University Microfilms International (1994).

Weiler, "The Radial Edge Structure: A Topical Representation for Non–Manifold Geometric Boundary Modeling," *Geometric Modeling for CAD Applications*, 3–36 (1988).

Xia et al, "Dynamic View–Dependent Simplification for Polygonal Models," *IEEE*, 327–498 (1996).

\* cited by examiner

FIG. 5

```
254    struct Vgeom              // Vertex geometry
254a      Point point            // position
254b      Vector normal          // normal 256    struct Vertex             // Static vertex
256a      AVertex* avertex       // active vertex, 0 if inactive
256b      Vertex* parent         // parent vertex, 0 if root        250
256c      int i                  // index of vspliti, -1 if leaf 258    struct Face               // Static face
258a      AFace* aface           // active face, 0 if inactive 260    struct Vsplit             // Vertex split
260a      Vgeom vu_vgeom         // geometry for child vertex
260b      Face* fn[4]            // required neighbors fn0,fn1,fn2,fn3
260c      Float radius           // max extent of affected region
          float sin2alpha        // angle for cone of normals
          float uni_error        // uniform error
          float dir_error        // directional error 262    struct ListNode           // Node on doubly linked list
262a      ListNode* next, prev
                    262b
264    struct SRMesh             // Selectively refinable mesh (SRM)
264a      Array<Vertex> vertices // all verticies in hierarchy [2n]
264b      Array <Face> faces     // all faces [2n]
264c      Array <Vsplit>         // vertex splits vspliti [n]
264d      ListNode active_vertices  // head of active vertex list
264e      ListNode active_faces//  head of active face list 266    struct Avertex            // Active vertex (on heap) [m]
266a      ListNode listnode      // list stringing active vertices
266b      Vertex* vertices       // pointer back to static vertex    252
          VGeom vgeom            // vertex coordinates (x,y,z)
          VertexMorph* vmorph//  not 0 if geomorphing 268    struct AFace              // Active face (on heap) [2m]
268a      ListNode listnode      // list stringing active faces
268b      AVertex* vertices[3]   // ordered counter-clockwise
268c      AFace* neighbors[3]    // neighbors [j] across from vertices [j]
268d      Int texture_id         // texture tile identifier 270    struct VertexMorph        // on heap [g]
270a      bool coarsening        // true if coarsening, false if refining
270b      short gtime            // # of geomorph frames remaining
270c      VGeom vg_refined       // refined geometry (back-up copy)
270d      VGeom vginc            // increment per frame during morph
```

FIG. 6 procedure vsplit($v_s$)

- 300 → $v_t \leftarrow$ &vertices[$|V^0| + v_s.i *2+1$]
- 302 → $v_u \leftarrow v_t + 1$
- 304 → $f_l \leftarrow$ &faces[$|F^0| + v_s.i *2+1$]
- 306 → $f_r \leftarrow f_l + 1$
- 308 → $f_{n0..3} \leftarrow$ vsplits[$v_s.i$].$f_n$[0..3]
- 310 → $v_t$.avertex $\leftarrow v_s$.avertex;  $v_t$.avertex.vertex $\leftarrow v_t$
- 312 → $v_s$.avertex $\leftarrow 0$

- 314 → ⎡ $v_u$.avertex $\leftarrow$ new AVertex;  $v_u$.avertex.vertex $\leftarrow v_u$
       ⎢ $v_u$.avertex.listnode.add_to_list (active_vertices)
       ⎣ $v_u$.avertex.vgeom $\leftarrow$ vsplits[$v_s.i$].vu_vgeom

- 316 → ⎡ $f_l$.aface $\leftarrow$ new AFace;  $f_l$.aface.listnode.add_to(active_faces)
       ⎢ [Fill in entries of $f_l$.aface]
       ⎢ $f_r$.aface $\leftarrow$ new AFace;  $f_r$.aface.listnode.add_to (active_faces)
       ⎢ [Fill in entries of $f_r$.aface]
       ⎢ [Update $f_{n0..3}$.neighbors[..] to point to $f_l, f_r$]
       ⎣ [For each face $f$ around $v_u$: update $f$.vertices[..]:$v_s \rightarrow v_u$];

FIG. 7

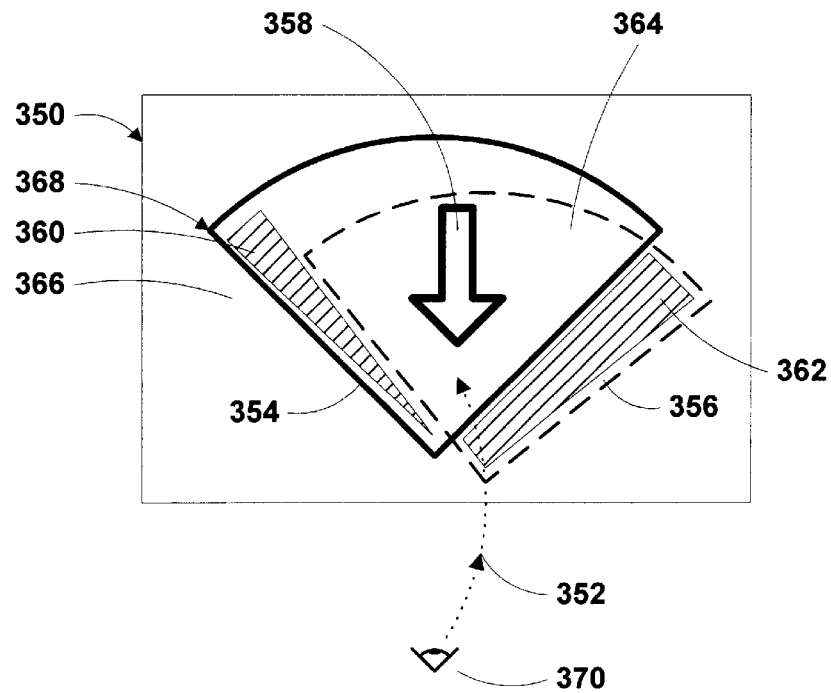

FIG. 9

```
function is_invisible(vs)
    return outside_view_frustum(vs) or
            oriented_away(vs)
```
420 — return outside_view_frustum(vs) or
422 — oriented_away(vs)

```
procedure vsplit(vs)
    ...                              // Code from FIG. 6
    if not is_Invisible(vs)          // i.e. if is visible
        vu.avertex.vgeom ← vt.avertex.vgeom
        vm ← vu.avertex.vmorph ← new VertexMorph
        vm.coarsening ← false
        vm.gtime ← gtime
        vm.vg_refined ← vsplits[vs.i].vu_vgeom
        vm.vginc ← (vm.vg_refined − vu.avertex.vgeom) / gtime
```
424 — if not is_Invisible(vs)
428 — new VertexMorph
432 — vm.gtime ← gtime
434 — vm.vg_refined ← vsplits[vs.i].vu_vgeom
436 — vm.vginc ← ...
270c, 438, 270b

FIG. 10

```
procedure update_vmorphs()
    for each v ∈ active_vertices
        if v.vmorph
            v.vgeom ← v.geom + v.vmorph.vginc
            v.vmorph.gtime ← v.vmorph.gtime − 1
            if v.morph.gtime = 0 delete v.vmorph
```
446 — for each v ∈ active_vertices
448 — if v.vmorph
450 — v.vgeom ← v.geom + v.vmorph.vginc
452 — v.vmorph.gtime ← v.vmorph.gtime − 1
454 — if v.morph.gtime = 0 delete v.vmorph

FIG. 11

```
procedure adapt_refinement()
    for each v ∈ active_vertices
        vₛ ← v.vertex
470     if vₛ.i ≥ 0 and not is_invisible(vₛ) and screen_error(vₛ) > τ
472         force_vsplit(vₛ)
474     else if vₛ.parent and ecol_legal(vₛ.parent)
476         vmc ← (v.vmorph and v.vmorph.coarsening)
478         if is_invisible(vₛ.parent)
480             if vmc finish_geomorph_coarsening(v)
                ecol(vₛ.parent)
482         else if screen_error(vₛ.parent) > τ
484             if vmc abort_geomorph_coarsening(v)
486         else if vmc
488             if v.vmorph.gtime = 1
490                 finish_geomorph_coarsening(v)
                    ecol(vₛ.parent)
            else
492             start_geomorph-coarsening(vₛ)
```

RUN-TIME GEOMORPHS

COPYRIGHT AUTHORIZATION

A portion of this disclosure may contain copyrighted material. The copyright owner has no objection to the facsimile reproduction by anyone of the patent document or the patent disclosure, as it appears in the Patent and Trademark Office patent file or records, but otherwise reserves all copyright rights.

FIELD OF THE INVENTION

The present invention relates generally to geometric modeling using polygonal meshes for computer graphics, and more particularly relates to techniques for optimizing computer resource (e.g., memory, CPU, etc.) requirements for the manipulation of large-scale meshes.

BACKGROUND AND SUMMARY OF THE INVENTION

Rendering real-time views on a complex model is a computation-intensive task. Current methods generally rely on encoding real-world objects in a complex three-dimensional geometric model which approximates the surfaces, textures and locations of the real-world objects. Objects are usually represented as a collection of polygons (but can be a mathematical description, fractal or the like) which are collected together to form a mesh having the shape and visual and/or tactile characteristics of the encoded real-world object. Realistic models of any reasonable size, e.g., simulating large-scale terrain meshes (see FIG. 2), can contain hundreds of meshes with millions of polygons to represent a realistic view of reality. Consequently, enormous computer resources are required to manipulate large meshes.

To simplify processing when rendering views of such detailed scenes, view-dependent progressive-meshes (VDPM) were developed. Hoppe shows a VDPM framework that represents an arbitrary delta-mesh (base mesh plus deltas required to produce a more detailed mesh)as a hierarchy of geometrically optimized transformations. A series of geomorph operations can be performed to convert between differing levels of detail of the progressive mesh. (For further information, see Hoppe, *Progressive Meshes,* Computer Graphics Proceedings, Annual Conference Series (ACM SIGGRAPH), pp. 99–108 (1996); Hoppe, *View-Dependent Refinement of Progressive Meshes,* ACM SIGGRAPH, pp. 189–198 (1997).)

In accordance with Hoppe's VDPM framework, a front across a progressive mesh hierarchy is defined. The Hoppe VDPM framework uses a progressive mesh representation of the original mesh model, which represents the mesh model as a simplified base mesh and a sequence of mesh refinement transformations (i.e., vertex splits) that, when applied to the base mesh, exactly reconstruct the original fully-detailed mesh. The front is developed by incrementally applying mesh refinement and coarsening operations subject to certain legality considerations. The legality conditions disallow some refinement operations unless other refinements operations are performed, and disallow some coarsening operations unless other coarsening operations are performed first In addition, for a given mesh, a viewpoint is defined with respect to the mesh. The viewpoint can correspond to what a user/viewer might see of a mesh, or it can be the portions of the mesh visible in a viewport. The phrase "selectively refined mesh" (SRM) corresponds to a mesh that is altered based on satisfying certain viewing criteria, such as changes in the viewport. The result is view-dependent level of detail (LOD) applied to different portions of a mesh. For example, viewing conditions may depend on the location of a flight simulator pilot in a mesh model, so that mesh detail centers on those portions of the mesh near the pilot's plane. For a view-dependent LOD, the active front is traversed for each frame being rendered, and every vertex of the front is either coarsened or refined based on the view-dependent refinement criteria. Examples of view-dependent criteria affecting the occurrence of a vsplit (vertex split) operation is whether a vertex's neighborhood intersects the view frustum (see FIG. 7), has a Gauss map not strictly oriented away, or has a screen-projected deviation from M that exceeds a predetermined (user-specified) pixel tolerance. (M represents an original fully-detailed mesh that has been deconstructed into a base mesh, to which delta operations are applied to obtain successively detailed meshes.)

It is understood by those skilled in the art that view dependencies concern the relationship between a viewpoint (e.g., camera location, user's eye, etc.), a defined viewing frustum (see FIG. 7), and a "current mesh" defined by a base mesh $M^0$+a set of refinement operations. When adjusting a SRM's coarseness, the change is either effected instantly, or geomorphed (interpolated) over time. Which method is used depends on whether an affected mesh region is entering, leaving, or staying within a particular viewing frustum. Only portions of a mesh remaining in view (i.e., within the frustum) need to be geomorphed to avoid "popping" the mesh alteration into place. In fact, geomorphs should be avoided for vertices entering and leaving the frustum, as discussed later.

Preferably, vertices entering and leaving the frustum are instantly adjusted, and vertices remaining in view are geomorphed over time. In addition, polygon orientation and distance from the frustum can be used to determine whether a local region of the mesh should be further refined or coarsened. For example, those polygons identified as facing away from a viewing position, or having too little impact on the display device, can be ignored without affecting output. The impact of a triangle's rendering to an output device (e.g., display monitor or video output) is dependent on the resolution of the device; if rendering only changes one or two pixels on the output device, rendering the triangle may cost more in computer time and resources than the visual benefit obtained from the rendering.

In addition, another significant problem with prior art mesh-based rendering systems is that notwithstanding using simplified meshes, these systems consume computer resources proportional to the size of the fully-detailed mesh $M^n$. That is, in the prior art, if $M^n$ has p faces, but has been simplified into a simpler mesh $M^0$ having only q faces, where q<<p (much less than), memory and other computer resources are allocated on a scale proportional with the connectivity of the larger mesh $M^n$. For example, to compute a geomorph between two selectively refined meshes procured from the progressive mesh hierarchy, prior art methods may require geomorph computations involving all active vertices, rather than on just those vertices needed for a view-dependent computation. And, once begun, the geomorph had to complete (or be reverted) before a new geomorph operation can be initiated. Consequently, computer resources (e.g. CPU speed, time, and storage space) to store and process the fully-detailed mesh are required even though the view is rendered based on only a small subset of its vertices.

For further information regarding techniques for constructing and using progressive meshes, view-dependent progressive meshes, and geomorphs, see: U.S. Patent AA for Encoding And Progressive Transmitting Of Progressive Meshes, bearing application Ser. No. 08/586,953 and filed Jan. 11, 1996; U.S. Patent BB for Selective Refinement Of Progressive Meshes, bearing application Ser. No. 08/797,501 and filed Feb. 7, 1997; U.S. Patent CC for View-Dependent Refinement Of Progressive Meshes, bearing application Ser. No. 08/826,570 and filed Apr. 3, 1997; U.S. Patent DD for Adaptive Refinement Of Progressive Meshes, bearing application Ser. No. 08/826,573 and filed Apr. 3, 1997; and U.S. Patent EE for a Method For Creating Progressive Simplicial Complexes, bearing application Ser. No. 08/880,090 and filed Jun. 20, 1997. These patents are incorporated herein by reference.

To overcome these limitations of prior art systems, the invention optimizes storage requirements by utilizing dynamic data structures for storing and manipulating a mesh that allocate storage based on the active vertices of the mesh (determined according to view-dependent criteria). This contrasts the prior art teachings of using static data structures proportional to the fully-detailed mesh. So, instead of statically storing mesh connectivity for an entire fully-detailed mesh $M^n$ (prior art), static data structures only encode the vertex hierarchy of the simplest mesh $M^0$ and the refinement dependencies required to produce $M^n$. Separate dynamic data structures encode, according to changes in view-dependent parameters, vertices and morph states for an active mesh. This results in substantial resource savings when (as is typical) the fully-detailed mesh is large, but the number of active vertices is just a small subset of the overall number of vertices.

The invention optimizes resource usage (e.g. storage and processor) by imperceptibly spreading transaction costs across multiple stages. Thus, for example, when performing a view-dependent selective refinement operation, rather than computing refinements for all active vertices in every frame, instead only a subset of the vertices might be considered in a given time period (or frame range). And, of those vertices determined to require alteration by geomorph or otherwise, only a subset of those vertices might be altered in a given time period.

Preferably, each stage is selected such that the multi-stage process is imperceptible to a viewer. For example, assume it is not noticeable if vertex evaluation is staged across ½ second of video. If the frame rate is 30 frames per second (fps), then the vertex evaluation can be spread across 15 frames, say one third processed each 5 frames. For each stage, a vertex can be determined as requiring refinement or coarsening. In this fashion, the invention can tailor rendering to the available resources of a host computing environment.

As a further optimization, when performing refinement operations, one of the new vertices from a vertex split (vsplit) operation can be required to assume the position of the ancestor vertex. This then ensures that only one new vertex need be allocated in the mesh data structures at every split.

As a further optimization, if it is determined that a geomorph refinement is required, a time limit can also be set for applying the geomorph. In effect this is the inverse of multi-staging the vertex evaluations. That is, in the former, a maximum number of frames is determined (e.g., 15), and the evaluation process distributed across them. Here, a maximum time limit for the geomorph is selected, and this determines the size of the incremental step taken in each video frame. For example, a geomorph can be set to occur over a one second period, so that the number of interpolation steps equals the frame rate fr (e.g., 60 frames/sec=60 transition steps, each having duration $fr^{-1}$). And, as with multi-stage vertex evaluations, one can also distribute geomorphs across multiple stages.

As a further enhancement over the prior art, geomorphs are overlapped to more efficiently process them. Geomorphing means, by definition, a mesh alteration that is being spread over time. A common problem is that a rapid change in viewing perspective can cause the end result of an in-progress geomorph to become invalid before it has completed. With prior art systems, before the new geomorph can be applied, the ongoing geomorph has to be completed normally, instantly "popped" to completion, or reverted. In each case, either time is wasted or visual artifacts introduced into the rendered output. To overcome these limitations, illustrated embodiments allow a geomorph to be altered mid-morph.

For example, assume an ongoing geomorph between first and second selectively refined meshes, $SRM_1$ and $SRM_2$. For these two SRM paths, a geomorph g(1) is constructed at run-time having all the lowest level vertices from both SRM paths through the refinement hierarchy. Vertices from active mesh $SRM_1$ then start gravitating towards $SRM_2$. Vertices from g(1) supply required ancestors/descendants for moving between $SRM_1$ and $SRM_2$. Now assume the viewpoint changes because a simulator combat-pilot maneuvers her plane to avoid being destroyed. This results in a $SRM_3$. Currently-morphing vertices will now gravitate towards the new requested $SRM_3$. When one introduces a new $SRM_3$ path across the hierarchy, this results in a new geomorph g(2) corresponding to the vertex states from g(1) and $SRM_2$. Intermediate vertices, which are at some interpolated position between $SRM_1$ and $SRM_2$, stop gravitating towards $SRM_2$ and instead begin gravitating towards $SRM_3$. By calculating these geomorph operations at run-time, it is no longer necessary to compute geomorphs between entire mesh levels (i.e. for all active vertices).

When a geomorph is interrupted with a new geomorph, in some embodiments, the motion of the vertex will simply stop progress on the original path, and will instead begin to move towards the new destination. In other embodiments, the path of the interrupted vertex follow a spline path having the original interrupted destination as a control point along a path terminating with the new destination. These intermediate control points can be stacked as new destinations interrupt the geomorph in progress.

Additional features and advantages of the invention will be made apparent from the following detailed description of an illustrated embodiment which proceeds with reference to the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 5 shows pseudocode for output sensitive data structures.

FIG. 6 shows pseudocode for an instantaneous vertex split transformation.

FIG. 7 shows a top-down view of forward motion of a viewer through a mesh.

FIG. 9 shows pseudocode for a refinement operation.

FIG. 10 shows pseudocode for an update_vmorphs( ) procedure which updates the positions of morphing vertices at each frame.

FIG. 11 shows an adapt_refinement( ) function for traversing the set of active vertices at each frame in order to perform refinements and coarsening transformations.

DETAILED DESCRIPTION OF ILLUSTRATED EMBODIMENTS

The present invention is directed toward geometric modeling using polygonal meshes for computer graphics. In particular, a view-dependent progressive-mesh framework allows view-dependent level-of-detail control over arbitrary triangle meshes. Such view-dependent control over mesh rendering is particularly well-suited for interactive environments, such as 3D games presenting flights over background meshes, or fly-through reviews of multi-dimensional models (e.g., a real-time fly-through of a CAD/CAM project). In such situations, a viewer/user only sees a small portion of an entire mesh model, and within the visible portion of the mesh many regions are distant and can therefore be represented at a coarser level-of-detail.

The invention conserves computer resources by limiting most resource allocation to those areas of the mesh that are visible (or near) to the viewer/user. Known progressive-mesh techniques are extended to achieve temporal coherence through the runtime creation, in real-time, of geomorphs. Creating geomorphs at run-time allow the mesh to remain in a coarse state until such time as user movement requires refining portions of the mesh.

The invention also conserves computer processing resources by distributing active-vertex evaluations and geomorph operations across multiple (but possibly overlapping) operations.

Exemplary Operating Environment

Figure 1:
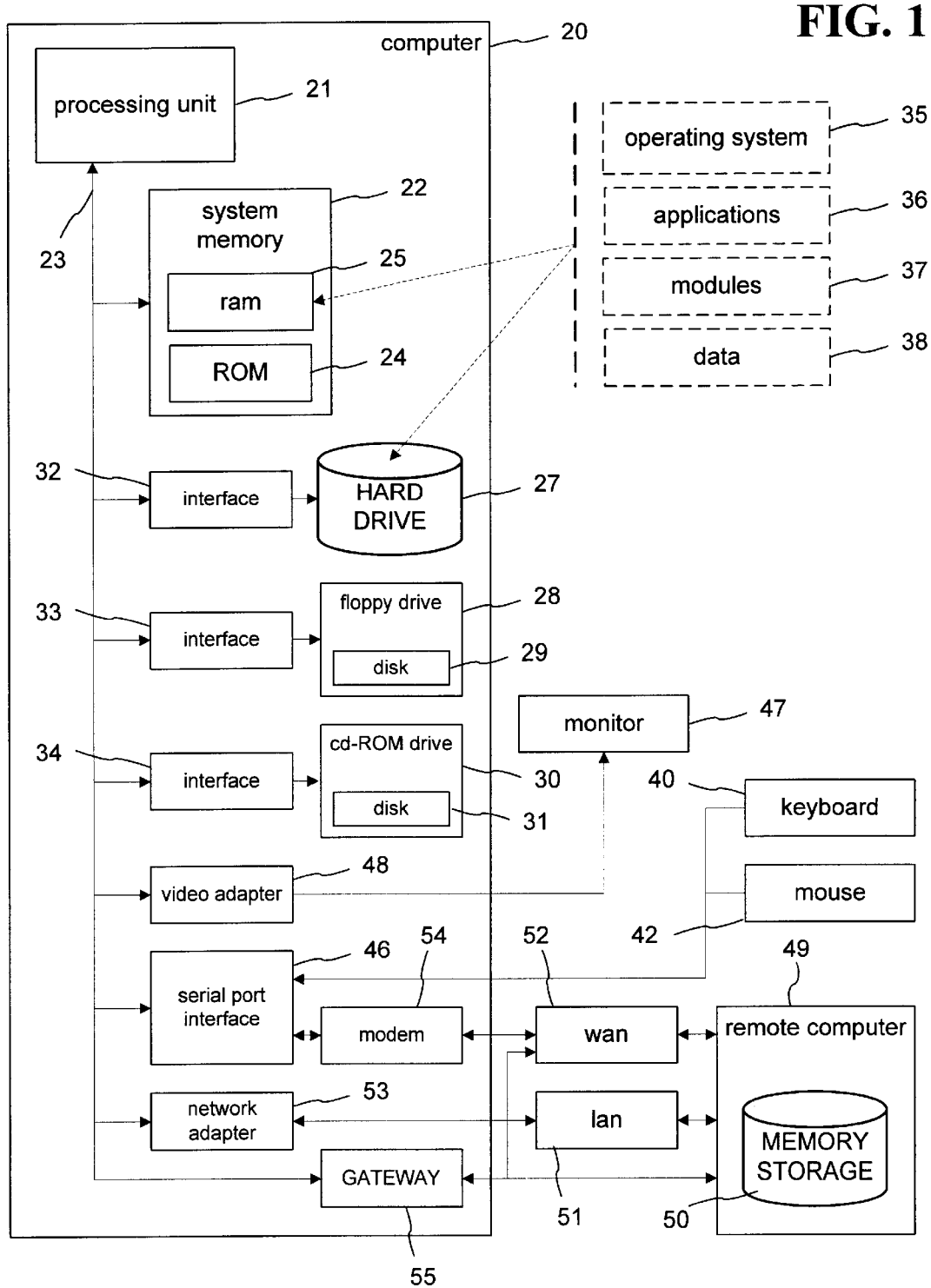
FIG. 1 is a block diagram of a computer system that may be used to implement a method and apparatus embodying the invention for run-time geomorphs and optimizing resource requirements for meshes.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, AGP, VESA, Microchannel, SSA, ISA, EISA, IEEE1394, Fibre Channel, and SCSI-FCP, to name a few. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Exemplary Complex Mesh

Figure 2:
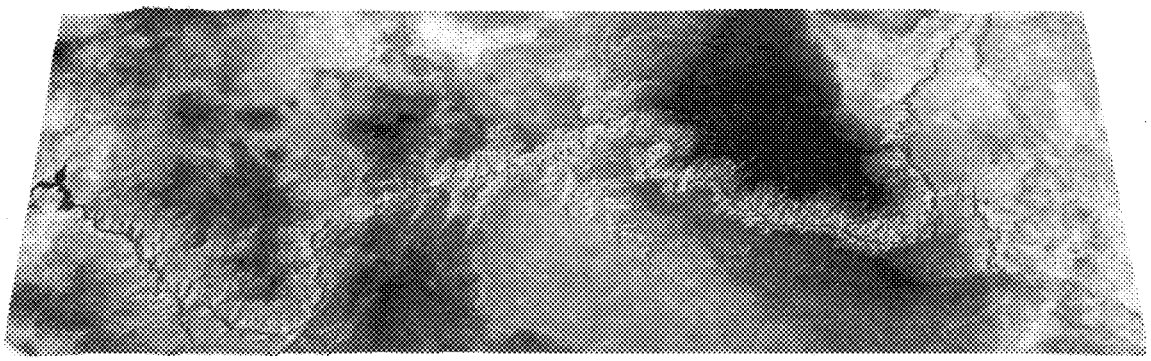
FIG. 2 shows an exemplary complex mesh.

FIG. 2 shows an exemplary complex mesh containing 4,097 by 2,049 vertices, corresponding to roughly 17 million triangles. This complex mesh cannot be realtime rendered on conventional computing hardware with prior art rendering systems.

The problem with such a large mesh is that the general approach for rendering such surfaces is to exploit the traditional 3D graphics pipeline, which is optimized to transform and texture-map triangles. The graphics pipeline has two main stages: geometry processing and rasterization. Typically, the rasterization effort is relatively steady because the rendered surface has low depth complexity. In the worst case, the model covers the viewport, and the number of filled pixels is only slightly more than that in the frame buffer. Current graphics workstations (and soon, personal computers) have sufficient fill rate to texture-map the entire frame buffer at 30–72 Hz, even with advanced features like trilinear mip-map filtering and detail textures. Such 3D processing speed is largely due to the advent of inexpensive consumer-oriented 3D graphics boards optimized for processing 3D graphics languages used to encode the models. Consequently, geometry processing proves to be the bottleneck. (Note that the techniques discussed herein can be applied to speed-up hardware-based geometry processors, for 3D graphics languages such as OpenGL, which are designed to widen the processing bottleneck.)

Due to this bottleneck, in the prior art, complex meshes require specialized hardware in order to render them in real time, since most high-end graphics platforms can not process, in real time, the geometry for more than a small fraction of the 17 million triangles. The invention overcomes this problem by optimizing the representation of the complex mesh. A progressive mesh hierarchy, having multiple simpler meshes, is substituted in real-time for portions of the fully-detailed (original/complex) mesh. Substitutions are made in real-time with respect with a viewer/user's changing viewing perspective (viewpoint) within the mesh, thus providing for real-time processing of complex meshes.

Fundamental to the invention's approach to handling such complex meshes is the realization that there is little point in rendering more triangles than there are pixels on an output device. For example, as noted, the FIG. 2 mesh has 17 million triangles. Output devices, such as monitors, commonly have about one million pixels. 17 million triangles represent a level of detail unnecessary to for the display output device, and many of the triangles can be removed without appreciably altering output quality. In addition, another insight is recognizing that a mesh surface usually exhibits significant spatial coherence, so that its perspective projection can be approximated to an accuracy of a few pixels by a much simpler mesh. For example, for the complex FIG. 2 mesh, a simpler mesh having only 2,000–20,000 triangle faces can serve as a reasonable substitute for the 17 million triangles.

Mesh Alteration

Figure 3:
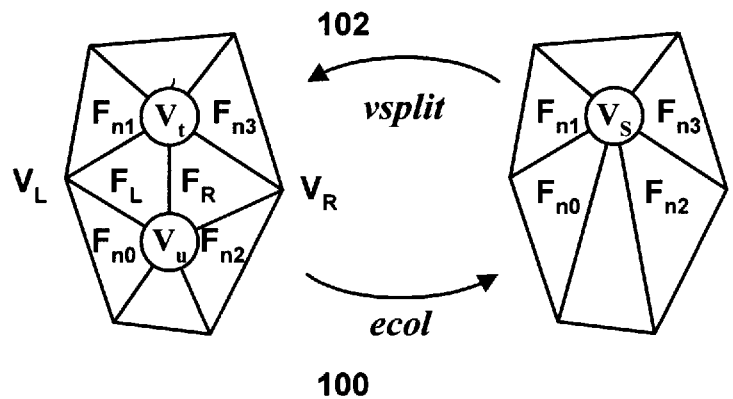
FIG. 3 illustrates an edge collapse operation.
Figure 4:
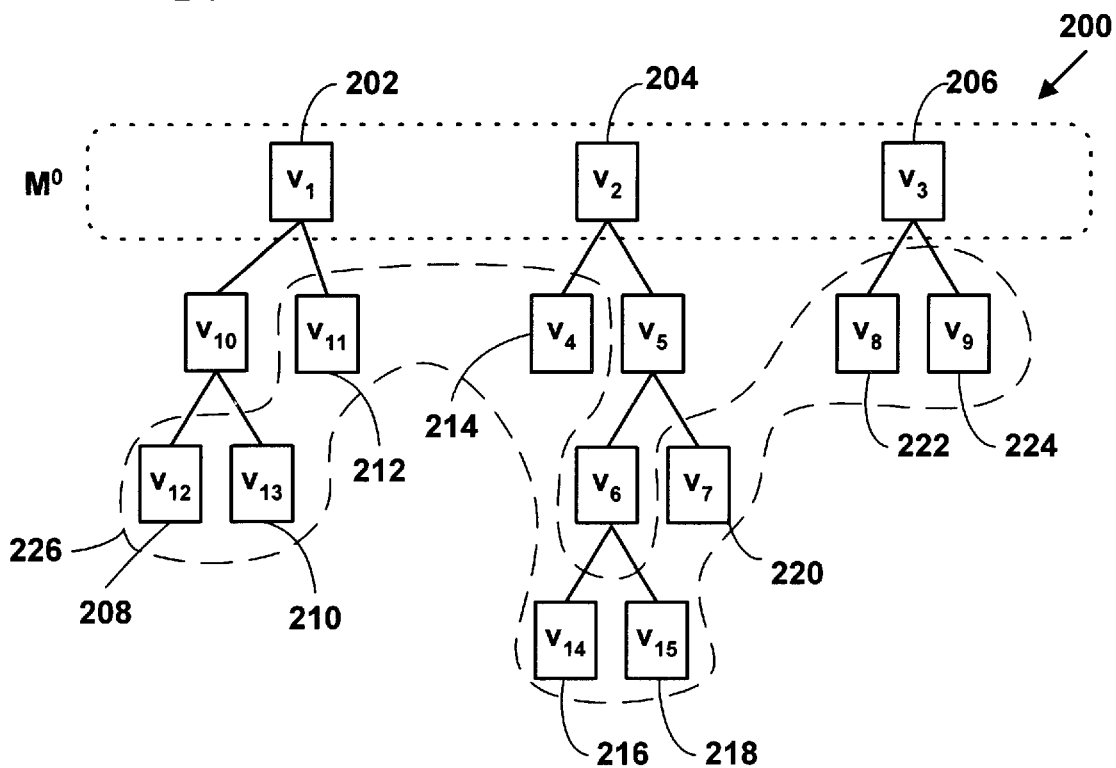
FIG. 4 shows a progressive mesh hierarchy.

In order to simplify a fully-detailed mesh $M^n$ such as FIG. 2, the mesh $M^n$ is decomposed (see FIG. 3 discussion) into multiple level of detail (LOD) layers arranged in a vertex hierarchy (see FIG. 4 discussion). The original mesh is simplified through a sequence of n edge collapse transformations. These edge collapse transformations (or their inverse vertex splits) define a vertex hierarchy. Note that the number of layers in this hierarchy is generally much smaller than n (and closer to $\log_2 n$). For choosing the sequence of edge collapses, the goal is to let the simplified meshes $M^i$ be most "like" the original mesh $M^n$. (The layers/levels in the hierarchy do not guide the simplification process). In determining each level of the hierarchy, the goal is to provide simpler meshes that are most "like" the more detailed mesh. There are many possible ways to simplify a mesh.

The best representative meshes are potential meshes MP having the least amount of error with respect to a more detailed mesh. Comparisons can be made between more-detailed intermediate meshes $M^{i+1}$, or more preferably, against the fully-detailed mesh $M^n$. A heuristic h is employed to compute the error between a more detailed mesh and the potential mesh, and quantify the degree of similarity between the meshes. The potential mesh MP having lowest error is selected to be the simplified mesh $M^i$ for a given level i of the hierarchy. In other words, a potential mesh $M^P$ results from applying collapse/split operations to a previous mesh, where the goal is to apply a heuristic to determine the "best" possible potential mesh. The term "heuristic" includes evaluating each and every collapse/split operation, as well as after a group of such modifications.

An edge collapse (ecol) is the fundamental operation for simplifying a mesh. During an edge collapse, an edge within the mesh is removed, and the associated vertices collapsed into a single vertex. Similarly, but in reverse, a vertex split takes a single vertex and breaks it into two separate vertices, and an edge and two faces is added between them. In both operations, mesh connectivity is updated to reflect the changes to the mesh, and as discussed below, the effects can be spread over time (geomorphed) to reduce "popping" and "snapping" of mesh alterations.

FIG. 3 illustrates an edge collapse 100 operation. Preferably, identifying and updating meshes is performed dynamically as viewing parameters change, and is referred herein as view-dependent level-of-detail (LOD) control. The general issue is to locally adjust the complexity of the approximating mesh to satisfy a screen-space pixel tolerance while maintaining a rendered surface that is both spatially and temporally continuous. To be spatially continuous, the mesh should be free of cracks and T-junctions. To be temporally continuous, the rendered mesh should not visibly "pop" from one frame to the next (as discussed below, real-time geomorphs are used to smooth mesh rendering).

The illustrated edge collapse (ecol) 100/vertex split (vsplit) 102 operation involves two vertices $v_u$, $v_t$, each vertex containing color data. The collapse combines the two vertices into a single vertex, and readjusts triangle sides and faces accordingly. The reverse operation is a vertex split. When rendering terrains, some special optimizations can be made, such as the omission of normals in the data structures, and other elements discussed in the text. (It should be emphasized, however, that the disclosed framework is valid for arbitrary triangle meshes.) The visual result of these two operations is to have the vertices gradually shift position over time. The triangle faces fl and fr disappear after the collapse is completed, and the connectivity for faces $f_{n0}$, $f_{n1}$, $f_{n2}$, and $f_{n3}$ is readjusted. Splits are used to define multi-resolution hierarchies for arbitrary meshes. The vertex hierarchy (FIG. 4) is constructed from a geometrically optimized sequence of edge collapse/splits in a progressive mesh representation. As shown $v_u$ and $v_t$ are collapsed into vertex $v_s$.

In order to simplify a mesh, a set of all possible edge collapses have to be generated and evaluated. For any potential collapse, a heuristic h evaluates the effect of edge collapse operation, and this information is used to identify which collapses result in a mesh "most like" a more detailed mesh.

Note that comparisons can be made between any mesh LOD, not just an immediately preceding/following mesh level. For example, the heuristic h can compare any potential mesh (defined by proposed edge collapse operations) against the original fully-detailed mesh $M^n$. (Comparing to $M^n$ is the preferred method for approximation-error calculation.)

Progressive Meshes

FIG. 4 shows a progressive mesh hierarchy formed from applying the FIG. 3 edge collapse operations to the FIG. 2 exemplary mesh.

The complex triangular mesh of FIG. 2 can be partially replaced by a set of pre-computed level of detail (LOD) approximations that are stored within a progressive mesh. A progressive mesh (PM) is a fully detailed mesh $M^n$ that has been deconstructed into n levels of detail, each LOD progressively simplifying a preceding mesh, until a base mesh $M^0$ is reached (see FIG. 4); $M^0$ represents the simplest form of mesh $M^n$ in use in the system, which may correspond to just a few triangles. A progressive mesh representation for $M^n$ is obtained by simplifying $M^n$ using n successive edge collapse transformations and recording their inverse. That is an edge collapse operation between two vertices, ecol({$v_s$, $v_t$}), unifies two adjacent vertices $v_s$ and $v_t$ into a single vertex $v_s^r$, the vertex $v_t$ and two adjacent faces $F_L$ ({$v_t$, $v_s$, $v_L$}) and $F_R$ ({$v_t$, $v_s$, $V_R$}) vanish in the process (see FIG. 3).

The particular sequence of edge collapse operations must be chosen carefully since they determine the quality of the intermediate levels of detail. Each of the n LOD operations can be stored in data structures (see FIG. 5) tracking the series of vertex splits (a vsplit is the inverse of an ecol operation) which, when applied to a current mesh $M^i$, results in a more refined mesh $M^{i+1}$. Applying all n transformations results in the original detailed mesh $M^n$.

Smooth transitions (geomorphs) can be created between two meshes $M^c$ and $M^f$ by defining intermediate meshes $M^j$ having vertex positions which interpolate between the positions of $M^c$ and $M^f$. Use of interpolating intermediate meshes allows smooth transitions without visible snapping of the meshes. As with vertex positions, scalar attributes defined on mesh faces can also be interpolated. There is a slight problem for corner (v, f) nodes in a mesh M, in that this node is not associated with an ancestor corner in a coarser mesh $M^c$. Nonetheless, values can be inferred by examining the mesh $M^f$ in which the corner is first introduced, locate a neighboring corner (v, f'), whose attributes are the same as (v, f), and recursively backtrack from (v, f') to a corner present in $M^f$. (If there is no such identical (v, f'), then the value of (v, f) is left constant.) Interpolation of vertices and associated attributes need not be linear (e.g., colors can be interpolated in RGB or other color spaces, and normals interpolated over the unit sphere.)

Each of the LOD refinements can be stacked to form a tree-like vertex hierarchy (See FIG. 4). Root nodes correspond to the vertices of the base mesh $M^0$, and leaf nodes correspond to the fully detailed mesh $M^n$. It is important to note that the sequence of vsplit refinements required to perform a view-dependent refinement uniquely define a vertex hierarchy, and permits the creation of selectively refined meshes, or meshes not in the original pre-computed refinement sequence. Although there is a particular ordering to the edge split or collapse operations, dependent on how the coarse mesh $M^0$ was developed, preferably all operations for a given LOD need not be performed. Instead, a vertex front can be defined through the vertex hierarchy. This front defines an active mesh, representing a particular series of edge collapse and vertex split operations.

In a view-dependent progressive-mesh (VDPM) framework, a sequence of refinement transformations uniquely defines a vertex hierarchy 200, in which the root nodes 202–206 correspond to the vertices of a base (simplest) mesh $M^0$, and the leaf nodes 208–224 correspond to the fully detailed mesh. This hierarchy permits the creation of selectively refined meshes, which as discussed above, are meshes not necessarily in the original sequence.

A selectively refined mesh is defined by a "vertex front" 226 across the vertex hierarchy, and is obtained by incrementally applying and transformations subject to a set of legality conditions/viewing constraints. Applying a particular sequence of refinements or coarsening operations results in a particular "active mesh," which is much simpler than the fully-detailed mesh $M^n$. This simplicity allows real-time manipulation of the simpler mesh.

Prior to rendering frame, the active vertex front is traversed, and each vertex is either coarsened or refined based on view-dependent refinement. Refinement is performed if a vertex's neighborhood satisfies predetermined criteria set according to the type of data being rendered. For large terrain meshes (for large triangle meshes), the preferred criteria is that the neighborhood satisfy 3 requirements: (1) it intersects the view frustum (the region of a mesh visible to a viewer/user), (2) its Gauss map is not strictly oriented away, and (3) its screen-projected deviation from exceeds a user-specified pixel tolerance. For efficient and conservative runtime evaluation of these criteria, each vertex in the hierarchy stores the following: a bounding-sphere radius, a normal vector, a cone-of-normals angle, and a deviation space encoded by a uniform component and a directional component. It is understood that other criteria, such as color or other characteristics, may also be stored therein.

It is assumed that the size of an active mesh $M^i$ (having m vertices) is insignificant compared to that of the fully refined mesh $M^n$ (having n vertices). Therefore, a fully detailed mesh has order n vertices and 2n faces, and the simpler mesh has order m vertices and 2m faces.

Storage-Optimizing Data Structures

A limitation of other progressive mesh methods, such as the VDPM taught in U.S. patent application Ser. No. 08/586, 953, is that all data structures scale proportionally with the size n of the fully refined mesh. In particular, static storage is allocated to represent the mesh connectivity for all faces in the mesh even though only a small fraction are usually active at any one time. Introduction of time-efficient geomorphs would therefore require the introduction of new data elements within all O(n) vertex/face structures. This requires extensive resources in order to compute geomorph transforms. The invention, in contrast, allows geomorph transformations without prohibitive memory use. Instead of having static allocation based on the size of the fully-detailed mesh, most memory allocations are deferred and implemented for vertices present in an active mesh.

FIG. 5 shows the data structures used by illustrated embodiments. As shown the structures are separated into two parts: a static part 250 encoding a vertex hierarchy 200 (FIG. 4) and refinement dependencies, and a dynamic part 252 encoding the connectivity of just the active mesh $M^i$. The static part is of size order n (here 88n bytes), and the dynamic part is of size order m (here 112m bytes). The static structures Vertex 256, Face 258, Vsplit 260, are allocated for each vertex in the hierarchy 200, as reflected by the arrays vertices 264a, faces 264b, and vsplits 264c in the SRMesh structure 264. The dynamic structures AVertex 266, AFace 268, VertexMorph 270, as discussed below, are allocated on an as needed basis.

The first of the static structures is VGeom 254, which contains the geometry for a point. Elements of the structure are a point 254a of type Point and a normal 254b of type Vector. The point represents the location within 3D space (which can be real-world or unit space), and the normal for the point. VGeom is never allocated on its own, but is used as a type declaration (like ListNode) and is allocated within the Vsplit, AVertex, and VertexMorph structures.

Structure Vertex 256, (of which there are 2n in array vertices 264a), contains pointers 256a, 256b to a dynamically allocated AVertex 266, and its parent Vertex structure, and an index i 256c of the vsplit$_i$ operation that creates its children. Index i is set to −1 if the vertex is a leaf node of the hierarchy. Since vertices are numbered consecutively, the index i is sufficient to compute the indices of the two child vertices $v_t$ and $v_u$ and vsplit operation, and of the one/two child faces $f_l$ and $f_r$ (see FIG. 3). This is accomplished by allocating two Face 258 structures to each vsplit even in the rare case that the vsplit creates only one face.

Structure Face 258, (of which there are 2n in array faces 264b), contains a pointer 258a to a dynamically allocated AFace 268 structure The pointer 258a is set to 0 (or other value indicating disuse or NULL) if the face is not active. An active face is one that is presently in the active mesh.

Structure Vsplit 260 (of which there are n in array vsplits 264c) contains a geometry element 260a a child vertex vie An array 260b for storing the four neighboring faces $f_{n0}$, $f_{n1}, f_{n2}, f_{n3}$. (See FIG. 3.) And four floating point values for a bounding-sphere radius 260c which contains the maximum extent $r_v$ of an affected region, a cone-of-normals angle $\sin^2\alpha_v$ 260d, a uniform error $\mu_v$ 260e, and a directional error $\delta_v$ 260f. (See also screen-space error discussion below.)

Structure Listnode 262 defines a general doubly-linked list. This structure contains pointers to the previous 262a and next 262b nodes in the node list. The list is used both by the Aface and by the AVertex nodes, as well as the head of lists active_vertices 264d and active_faces 264e to keep track of active faces and vertices.

Structure SRMesh 264 corresponds to a particular selectively refinable mesh $M^i$. Within SRMesh are three arrays and two ListNode lists. The first array 264a, of size order 2n, is an array containing all vertices in the hierarchy. The second array 264b, of size order 2n, is an array containing all faces in $M^n$. (Note that any selectively refined mesh contains a subset of the faces of $M^n$]. The third array 264c, of size order n, is an array containing the chain of vertex split operations encoding how to generate the completely detailed mesh $M^n$ from current mesh $M^i$. Recall that the vertex split lists are generated by recording, in reverse order, the generation of the base (i.e., most simplified) mesh $M^0$. The first ListNode list 264d tracks the head of the active vertex list, and the second ListNode list 264e tracks the head of the active face list. Since 2,000–20,000 triangles may only be active our of 17 million triangles in a mesh, only allocating space for active vertices and faces greatly reduces memory consumption.

The dynamically allocated structures 252 require order m storage space (recall that m is the number of active vertices), which is significantly less space then order n (FIG. 4 discussion above, m<<n). One can also optimize access as well as storage requirements through register-variable optimizations, optimizing memory boundaries, in-line coding, loop-reductions, etc. For clarity, these compile-time optimizations have been omitted.

The first dynamic structure of FIG. 5 is the AVertex 266 structure, of which there are m, that contains the active vertices in the hierarchy. Contained within the structure is a ListNode 266a reference to a doubly-linked list of all active vertices in the mesh hierarchy. A Vertex pointer 266b points back to the static Vertex 256 referencing this structure. A VGeom element contains the x, y, z coordinates for the Vertex 256 allocating this structure (266). Unless a vertex is in use, this structure is not allocated. This contrasts other progressive-mesh schemes which allocated storage for every node in the hierarchy irrespective of its activity. Element vmorph points to a VertexMorph structure (described below) which tracks morphing vertices. It is set to 0 if the vertex is not currently morphing.

Structure AFace 268, of which there are approximately 2 m, tracks the active faces in the selectively refined mesh. This structure contains a Lisotode list 268a tracking the list of active faces. An AVertex pointer 269b points to the three vertices, ordered counter-clockwise, that make up the face defined by this structure 268. An APace pointer 268c points to the (up to) tree neighboring faces of the face defined by this structure. Recall that these are the neighboring faces bordering the current triangle face, and they are numbered such that a neighboring face j is located across from/ opposite to a vertex j of the current triangle face.

The final element is an integer 268d referencing a texture tile identifier for the face. Rather than storing textures themselves, only indices 268d into a texture mapping are tracked.

Structure VertexMorph 270, of which there are g (the number of geomorphing vertices), represents each vertex that is in the process of geomorphing. This structure contains a boolean value 270a indicating whether the vertex 256 associated with this structure (Vertex→AVertex→VertexMorph) is undergoing coarsening.

There are two options for handling geomorph coarsening. The FIG. 5 data structures shown here, for simplicity, presume the simpler method for coarsening is in effect, i.e., one cannot overlap the coarsening operations as one can do with the refinements. In a first alternate method, the structures are modified to contain duplicate AVertex 266 and AFace 268 entries in each Vertex and Face structure. In effect, two meshes are tracked, one for rendering, and the other for determining dependency evaluation. Thus the number of active records linearly increases by a factor of 2.

In another alternate method, a different structural framework is used in which dependencies between transformations are stored explicitly, so that evaluating dependencies does not require modifying the connectivity of the mesh. Overlapping transformations concerns when mesh connectivity is altered. Presently, for a coarsening operation, connectivity is only updated after completing the operation, hence preventing overlaps. In this alternate method, this overlap restriction is removed by use of a framework such as that proposed by Xia and Varshney could be used to explicitly store for each vertex split the list of prior vertex splits on which it depends. (Xia and Varshny, *Dynamic view-dependent simplification for polygonal models*, In Visualization '96 Proceedings (1996), IEEE, pp. 327–334.) Although the Xia and Varshny framework requires variably sized records, overlapping geomorph coarsenings can be efficiently implemented.

Although allowing overlapping coarsening increases memory requirements, static data allocation is not greatly impacted. The extra data will be dynamically allocated for the active vertices m, resulting in a linear increase linear with respect to m.

Also within structure VertexMorph 270 is a gtime counter 270b indicating the number of remaining frames in the associated vertex's 256, and two VGeom elements. The first VGeom entry vg_refined 270c stores a backup copy of the morphing vertex's refined geometry, and is used as a temporary placeholder in functions such as vsplit to maintain the vertex's current state before it is altered. One skilled in the art will recognize that the vg_refined 270c variable can be removed from the vsplit function by increasing the complexity of the code.

To enable geomorphs, each active vertex has a field vmorph 266d, which points to a dynamically allocated VertexMorph record 270 when the vertex is morphing. In practice, the number g of morphing vertices is only a fraction of the number m of active vertices, which is itself only a small fraction of the total number n of vertices. Overall, then, the data structures need 88n+112m+52g bytes (or 12(2n)+4(2n)+56n+40m+36(2m)+52g). This is much less than the storage requirements of other methods. For example, the prior progressive-mesh method of application Ser. No. 08/586,953 required 224n memory resources.

In addition, because in practice the number of active faces 2m is generally about 12,000, and 12,000 is less than 65,536, the AVertex* 256a and AFace* 258a pointers in the static structure can be replaced by 16-bit indices. Additionally, in Vsplit 260 we can quantize the coordinates to 16 bits and use 256-entry lookup tables for $\{r_v, u_v^2, o_v^2, \sin^2 a_v\}$. Static storage is then reduced from 88n to 56n bytes. In comparison, a standard representation for a pre-simplified, quantized, irregular mesh uses 42n bytes of memory, (n)(12) bytes for positions and normals, and (2n)(3)(4) bytes for connectivity). Thus the illustrated view-dependent progressive-mesh framework only requires a 33% increase in memory over static non-LOD representations.

FIG. 6 shows pseudocode for an instantaneous vertex split (vsplit) transformation. The illustrated transformation modifies prior split implementations so that dynamically allocated data structures can be used. (Code for an ecol( ) procedure is defined analogously.)

As compared, for example, with U.S. patent application Ser. No. 08/586,953, geometry storage is considerably reduced by modifying the vsplit I ecol transformations to force vertices $v_s$ and $v_t$ to have the same geometry, as shown in FIG. 3. This optimization, while optional, results in an average increase of 15% in active faces. Additionally, instead of storing the texture identifiers for the new faces fl and fr, in the Vsplit structure 260 (FIG. 5), they are inferred during a vsplit from the adjacent active faces $fn_1$ and $fn_3$ respectively.

Shown is pseudocode for applying to the selectively refined mesh the vertex split $vsplit_i$ that splits a vertex $v_s$ into two vertices, $v_t$ and $v_u$. (See also FIG. 3.) The value of the vertex pointer to $v_t$ is obtained by computing the address in the array vertices 264a by setting $v_t$ equal to element no. $|V^0|+2v_s.i*2$, where $|V^0|$ is the number of vertices $V^0$ in the base mesh $M_0$, and $v_s.i$ is the index 256b of $vsplit_1$, with the vsplits 264c array. Thus, at step 300 vertex $v_t$ gets the vertices of $v_s$ as determined by taking the vertices $V^0$ of base mesh $M^0$ and indexing into the list of split operations by i (times 2) steps; at step 302 $v_u$ gets the position in the vertex array of $v_t+1$. (The vertex pointer to $v_u$ is simply $v_t+1$ since the two children $v_t$, $v_u$ are always placed consecutively in the array vertices.) Irrespective of whether the hierarchy is stored as an array, linked list, or other construct, split and collapse operations, and texture values, are tracked by simple indices. These indices can be also be compression-encoded to compactly represent the data inter-relationships.

For the new left and right faces $f_l$, $f_r$, at step 304 (the pointers to faces fl and fr are derived from the index vs.i of the vertex split that splits vs, much as above) $f_l$ is assigned its value from $v_s$, (indexed into the faces 264b array by $v_s$'s index 256c value). Due to how the storage hierarchy is represented in the FIG. 5 data structures, at step 306 $f_r$'s value is the subsequent array entry. Recall that a selectively refinable mesh is represented as an array of vertices and an array of triangle faces, where only a subset of these vertices and faces are active in a current mesh $M_i$. The two doubly-linked lists 264d–e (FIG. 5) thread through a subset of all vertex and face records. In the Vertex structures, the vsplit index i and parent 256b pointers allow traversal of the entire vertex hierarchy. When $v_s$ can be split, the function vsplit( ) requires v's neighbors $f_{n_0 \ldots 3}$ (FIG. 3) which are encoded in v's associated Vsplit structure 260, and faces $f_l$ and $f_r$, which are accessed through splitting vertex $v_s$'s vsplit index value i, which is used to index into the current mesh $M_i$'s faces 264b array.

So, at step 310 $v_t$ acquires $v_s$'s avertex pointer reference, but at step 310 $v_t$ replaces $v_s$'s avertex.vertex back-reference with $v_t$'s back-reference. At this point, $v_s$'s useful data is exhausted and the $v_s$ node is released. Alternatively, rather than creating a new vertex $v_t$ and deleting old-vertex $v_s$, the contents of $v_s$ can just be modified with $v_t$'s new data (shown in FIG. 6). For new vertex $v_u$, since vu is not inheriting data from a pre-existing vertex, at step 312 $v_u$ is initialized as a new node and added to the vertex list-node tracking list 312. Finally, at step 314 initialization for the left and right faces is completed.

Run-time Geomorphs

FIG. 7 shows a top-down view of the forward motion of a viewpoint 370 through an active mesh 350. Shown is a view on the model from above, with a first outline indicating the present viewing frustum 354, the previous viewing frustum 356, and the advancing geomorph refinements 358 occurring due to the user's forward movement 352. As the viewpoint moves forward through the mesh 350, the current is level of detail either remains stable or is refined. If the viewpoint were to retreat, as discussed above (FIG. 5) mesh data is coarsened.

In a highly visual environment, such as a flight simulator, it is crucial that the rendered scenes be (1) presented smoothly to a viewer/user, (2) but without mesh popping. At first, these two goals seem contradictory, since the common method for no obtaining high frame rates is (1) dropping intermediate frames, resulting in large "steps" from frame to frame, or (2) maintaining screen-space error tolerance at a value of 1 pixel, with a constant error tolerance, resulting in the number of active faces varying greatly depending on the model complexity near the viewpoint, and a non-uniform frame rate.

It is preferable that a constant frame-rate be maintained. This can be accomplished by adjusting the screen-space error tolerance, and eliminating resulting mesh popping by smoothly morphing the geometry (hence the term "geomorphing") over time. Therefore, even though the model may (at times) have a projected geometric error of a few pixels, the error is imperceptibly smoothed over a geomorph transition. In addition, because geomorphs hide discontinuities in a mesh, pixel error tolerance can be increased to allow higher frame rates (e.g., 72+frames/sec).

As discussed above, view-dependent LOD results in mesh complexity controlled by predetermined refinement criteria which indicates the need for an edge collapse (ecot) or vertex split (vsplit). To reduce unnecessary popping of a mesh rendering, the rate of mesh transformation (e.g. the number of steps, or length of time to perform the transformation) depends on whether a given portion (e.g. mesh elements such as vertices or faces) of an active mesh is entering 360, leaving 362, or staying within 364 the current viewpoint's viewing frustum 354. For mesh portions staying within the frustum 354, instead of performing instantaneous transformations, they are performed as a geomorph by gradually changing the vertex geometry over several frames. A transformation is not performed as a geomorph unless the region of the affected surface is facing the viewer. Note that for height fields (i.e. terrains or elevation data), facial orientation is not determined since vertex normals are a discarded to reduce memory requirements. However, this does not impose a significant penalty since surface meshes are viewed essentially horizontally (e.g. from on-high, looking across the breadth of the mesh, and there is only a small fraction of triangles that are completely facing away and unnecessarily rendered. (Due to how textures are mapped onto surfaces, the important thing is that the mesh is not viewed from below/underneath.) In addition, if face orientation were needed, it can be determined from geometric analysis of vertex positions in the model-space (e.g., within the model's coordinate system).

A transformation is also not performed unless the affected region overlaps the view frustum 354. It is undesirable to initiate a geomorph on a region 362 known to be invisible, because according to the refinement criteria, such a region may have unbounded screen-space error. (See also FIG. 9 discussion; the decision to geomorph and the decision to refine the mesh must both either use or both ignore face orientation.) If such a region were to become visible prior to the end of the geomorph, it could lead to an arbitrarily large screen-space displacement. For example, as the frustum 354 pans left, the nearby off-screen region 366 should not be morphing from its coarse state as it enters the left edge 368 of the viewport.

Note that although the above discussion focuses on manipulating vertex positions, it is understood that besides position information, vertices contain other attributes such as a normal, color, texture coordinates, alpha, blend data, etc. Preferably, normals are interpolated over the unit sphere, and other attributes linearly interpolated.

Also, texture coordinates are generated implicitly rather than explicitly during rendering using a linear map on vertex positions. Each AFace structure 268 (FIG. 5) contains a texture_id 268d identifying the relevant texture data. Because the map is linear, these texture coordinates are identical to those that would result if texture coordinates were tracked explicitly at vertices.

Geomorph Refinement

Figure 8:
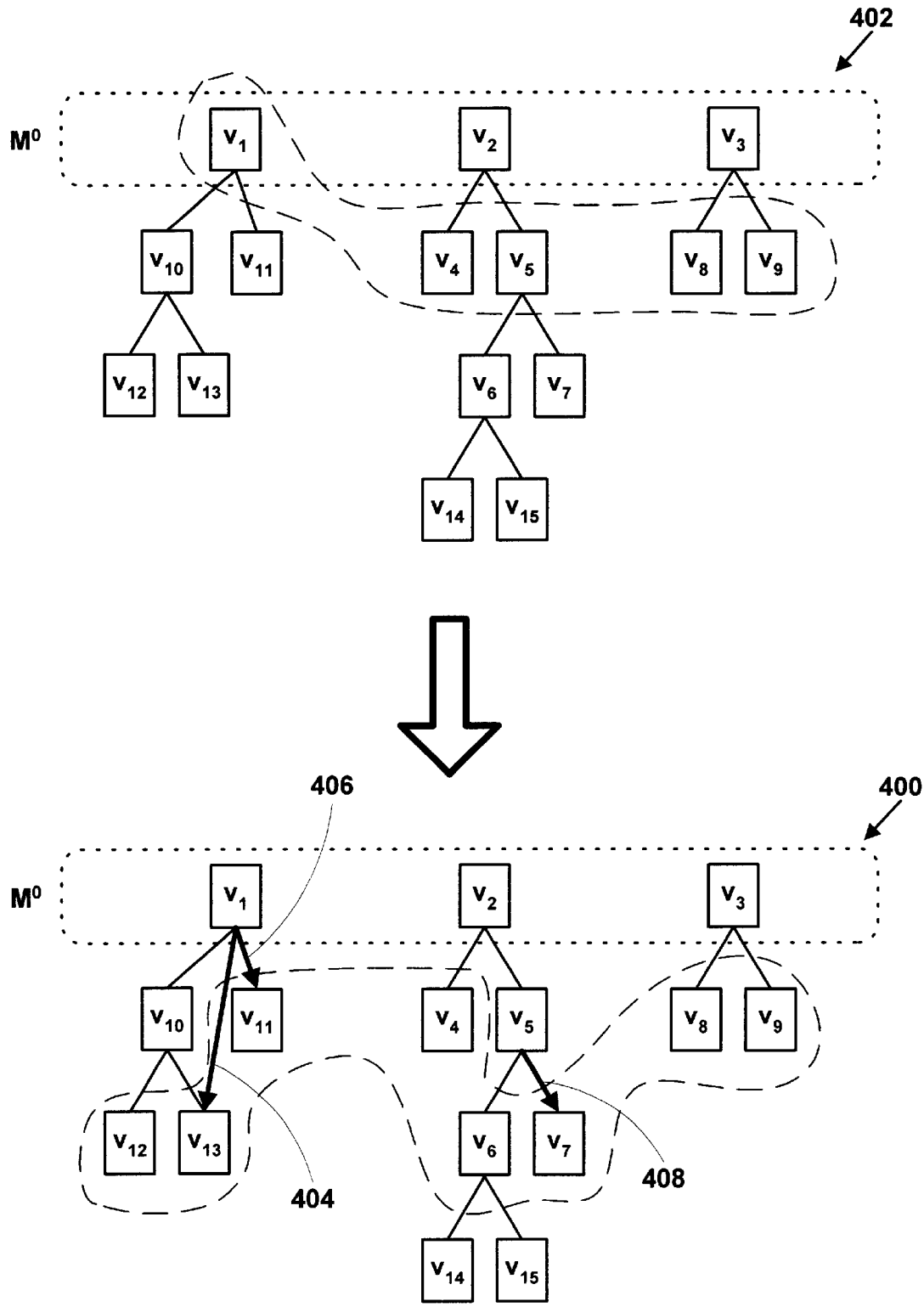
FIG. 8 shows changes to the FIG. 7 mesh resulting from the viewer's forward movement.

FIG. 8 shows changes to an active mesh 400 resulting from the forward movement of the viewpoint 370 (FIG. 7) through the mesh 350. Here, mesh 400 is obtained by applying three vertex splits to mesh 402. To obtain a smooth transition between the two mesh states, the geometry for vertices $\{v_{13}, v_{11}, v_7\}$ are gradually interpolated from those of their ancestors as indicated by the arrows 404–408. As an optimization to the interpolation process, as discussed above (FIG. 6), one of the vertices in a vsplit operation remains at the position of the ancestor vertex. Thus, position $v_{12}=v_1$ and $v_6=v_5$, so no interpolation is necessary for these vertices. Geomorph refinement can use essentially the same Vsplit procedure and related data structures as discussed for FIGS. 5 and 6.

FIG. 9 shows pseudocode for a preferred refinement operation. This code extends the pseudocode of FIG. 6 to detect and perform geomorph refinement using a vertex split transformation. (Refinement geomorphs can be overlapping.) An is_invisible( ) function incorporates the determination of whether a vertex meets the view-dependent criteria for rendering. Generally, two basic tests are performed. The first test 420 is to determine whether a vertex $v_s$ is outside the viewing frustum 304 (FIG. 7), and the second test 422 is whether the vertex is oriented away from the viewpoint 370 (FIG. 7). The first test simply requires evaluating the position of the vertex in the model's 3D space. But, the second test ordinarily requires evaluating the normal vector 254b (FIG. 5) for the vertex $v_s$. But, some embodiments of the invention may choose reduce storage requirements by not tracking the normal vector. In this circumstance, there are three options. The first is to disregard the test, and the second is to perform backfacing surface removal, and the third is to analyze triangle face orientation based upon the position of vertices to effect hidden surface removal. (Hidden surface removal is a more difficult problem, and if surface removal is required, a backface removal is preferred). For most configurations, the first option of rendering irrespective of orientation is reasonable if it is likely that a small percentage of faces are invisible. In this circumstance, the time required to compute an orientation analysis can exceed the time required to unnecessarily render them.

Assuming is_invisible( ) returns false, then a modified vsplit( ) procedure is called to split a node $v_s$. (If "not is_Invisible($v_s$)" evaluates True, then is_Invisible($v_s$) must evaluate False, i.e., $v_s$ is visible.) After execution of the initialization code 300–316 (FIG. 6), vertex $v_s$ is tested to verify it is presently visible 424. If so, the coordinates for $v_u$ is assigned the values for $v_t$. If $v_s$ is not visible (with respect to a viewing perspective and viewing frustum), then the transformation is not performed as a geomorph over time, and instead the vertex is instantly updated. As with the FIG. 6 refinement operation, mesh connectivity can still be instantly modified, but here the new vertex $v_u$ is initially assigned the same geometry as its sibling $v_t$, rather than directly assigned $v_s$'s values. $V_u$'s geometry is then gradually modified to the geometry of its eventual refined state over the next gtime 432 frames.

A new VertexMorph structure 270 (FIG. 5) is created 428 for morphing vertex 442. Since this is a refinement operation, structure member coarsening 270a is set false, and element gtime 270b is set 432 to the number of frames over which to spread the refinement operation. The parameter gtime can be user-specified. By default, gtime is equal to the frame rate (e.g., 30–72 frames/sec), so that geomorphs have a lifetime of one second. Note that the geomorphs do not require the introduction of additional faces, as the mesh connectivity is exactly that of the desired refined mesh. The issue is not one of adding vertices or faces, but the relocation of vertices and the associated readjustment of facial connectivity.

The vg_refined 270c backup copy of the refined geometry is set 434 to the child vertex geometry for $v_s$.i, where i is the vsplit index entry for vertex $v_s$. Vg_refined 270c represents the ultimate refined position for a geomorphing vertex, and is used to determine an interpolation increment 436 based on the distance between the starting 438 and ending 270c (FIG. 5) positions of the morphing vertex. This total distance is then divided by gtime 270b to determine how far the vertex is to move in a given frame.

A key feature of the illustrated geomorph refinement is that the refinement operations may overlap; that is, since vertex connectivity is updated before the geometry is interpolated, a new geomorph process can be applied to a vertex $v_s$ already undergoing morphing. Causing a new refinement generates two new nodes $v_t$ and $v_u$, as discussed herein, where one node continues along $v_s$'s original path, and the other continues on towards the new refinement position for that vertex. When an overlap occurs, the vsplit procedure (FIG. 6) simply advances the vertex front down the vertex hierarchy (possibly several "layers"), and modifies mesh connectivity instantaneously while deferring geometric changes. FIG. 8 shows the results of three vertex splits. Since the refinements overlap, there is some ability to perform operations in parallel to achieve performance gains. (See references cited in the background for more information regarding is_invisible( ) and vsplit( ) procedures.)

FIG. 10 shows pseudocode for an update_vmorphs( ) procedure which updates he positions of morphing vertices at each frame. At each frame, the set of active vertices (264d of FIG. 5) is traversed 446, and for each morphing vertex $v_m$ 448, its geometry is advanced 450 and its gtime 270b counter decremented 452. When the gtime reaches 0, vertex $v_m$ 448 has reached its goal geometry and the VertexMorph record 270 is deleted 454. Geomorph coarsening operations reverse a series of refinement operations. As discussed above, when performing a refinement operation, the connectivity of the old and new nodes is updated first, and then the nodes gravitate to their new locations over gtime number of incremental steps. When performing the coarsening operation, similar steps can be implemented to, in effect, reverse a refinement operation.

Geomorph Coarsening

In the basic case, geomorph coarsening requires that geometry interpolation take place first, and then mesh connectivity can be updated to reflect the changed geometry. This contrasts refinement operations, in which connectivity is updated first (the node is split), and then geometry positions interpolated over gtime. In this configuration, there cannot be multiple overlapping coarsening operations because the connectivity is not updated until after the coarsening operation is complete, resulting in an ancestor-vertices problem. That is, it is impossible to detect whether the second coarsening operation is legal, to determine if the proper neighborhood of faces is present around $v_s$ ($v_t$ for moment, since $v_t$ will become $v_s$) and $v_w$ to allow that second edge collapse to occur in the future.

For example, if a first coarsening operation were to collapse $v_u$ and $v_t$ into $v_s$ (see FIG. 3), and a second coarsening operation were to collapse $v_s$ and $v_w$ into $v_x$, this second operation could not be performed until the first coarsening operation completed and created $v_s$. (Note that coarsening difficulties are not inherent to the VDPM framework, and also arise in multiresolution hierarchies based on uniform subdivision.)

Disallowing overlapping coarsening operations avoids the issue of ensuring properly configured ancestor vertices for dependents. Thus, in this basic case, geomorph coarsening is only allowed "one layer at a time". Out of the set of desired geomorph coarsenings, all currently legal ones are simultaneously performed, and their dependents are required to wait for the initial geomorphs to complete. To help make the process appear more efficient, the gtime parameter for geomorph coarsening can be set to one half the time for geomorph refinement. By reducing the number of incremental steps for coarsening is one half for refinement, coarsening occurs over fewer frames. Thus, coarsening appears twice as fast as refinement, but less smoothly due to the reduce number of times over which the geomorph is processed. But, since geomorph coarsening is required only when the viewer is moving backwards, an infrequent situation, the degradation in output is not very noticeable.

To overcome this restriction on overlapping geomorph coarsening, as discussed above for FIG. 5, the data structures tracking a mesh can be altered to allow for immediate response to coarsening requests.

Modified Screen-space Error Metric

For the illustrated embodiments, a geomorph refinement (forced_vsplit($v_s$)) is initiated only when the screen-projected deviation of its mesh neighborhood exceeds a pixel tolerance τ. (See Hoppe, supra, *View-Dependent Refinement of Progressive Meshes*, at 193.) This prevents wasting processing resources on rendering faces having too little effect on output. A problem arises in that the viewer is moving (see FIG. 3, item 302), and the mesh neighborhood is likely to be closer to the viewer by the time the geomorph completes; this then invalidates the error estimate. This issue can be resolved by anticipating the viewer location gtime frames into the future, and evaluating the screen-space error metric from that future configuration. This future location can be estimated by extrapolation based on the current per-frame viewer velocity $\Delta e$. (A more rigorous, and computation intensive, solution is to account for changes in velocity, and altering the lifetimes of ongoing geomorphs as necessary.)

The original refinement criterion from application Ser. No. 08/586,953 is: $(\delta_v/\|v-e\|) \text{sqrt}(1-(((v-e)\cdot \hat{n}_v)/\|v-e\|)^2) > \kappa$ where e is the viewpoint, v the mesh vertex, $\hat{n}_v$ its normal, $\delta_v$ its neighborhood's residual error, and $\kappa = 2\tau \tan(\psi/2)$ accounts for field-of-view angle $\psi$ and pixel tolerance $\tau$. The square-root factor allows greater simplification when the surface is viewed along the direction of its normal. (For meshes with fixed $\tau$, this factor only reduces the average number of active faces by about 3%, so it can be omitted.) The denominator $\|v-e\|$ is an estimate of the z coordinate of the vertex v in screen space. We replace this denominator with the linear functional $L_{e,\vec{e}}(v)=(v-e)\cdot\vec{e}$ which computes this z coordinate directly (e is the viewing direction). Thus, the screen-space error criterion is $\delta_v > \kappa L_{e',\vec{e}}(v)$, in which the point e' is either the current viewpoint or the anticipated future viewpoint e+gtime $\Delta e$ depending on whether $\Delta e \cdot \vec{e}$ is negative or positive respectively.

FIG. 11 shows an adapt_refinement( ) function for traversing the set of active vertices at each frame in order to perform refinements and coarsening transformations. (Refinement geomorphs can be overlapping, but coarsening geomorphs are independent.) FIG. 11 is the loop that is performed at each frame to determine whether active vertices should be refined or coarsened, and whether those refinements or coarsenings should happen instantly or as geomorphs. For each active vertex v in the active vertices array 264a (FIG. 5), $v_s$ is initialized 470 to point at v's back-reference to v's static vertex structure 256. The next step is to determine that vertex $v_s$ is not a leaf node of the hierarchy (i.e., index i<0), that $v_s$ is visible, and that screen error is greater than error tolerance $\tau$. If these conditions 472 are met, then a vsplit is forced.

If these conditions 472 are not met, then a split is not appropriate and checks are made 474 to determine whether an edge collapse is appropriate. If vertex $v_s$ has a parent and it is legal to perform an edge collapse, then boolean variable vmc is assigned 476 the logical-and result between active vertex v's current morphing state and whether v is already undergoing a coarsening operation (i.e. vmc is true if and only if the vertex v is currently undergoing geomorph coarsening.) The v's parent vertex v.parent is then checked 478 for visibility. If the parent is invisible (i.e., rendering rejected based upon selected viewing criteria), then if vmc is true, v is allowed to immediately finish its geomorph coarsening transformation 480 (i.e., its position jumps to its final coarsened state). Otherwise, the parent is visible, its screen error is checked 482 to determine if it is greater than error tolerance $\tau$. If the parent's error tolerance is more than $\tau$, then there is no point to coarsening the mesh, and the geomorph coarsening is cancelled 484, thus instantly returning the vertex v to its refined state. Alternatively, if the parent's error tolerance is less than or equal to $\tau$, vmc is true, and if v's morphing gtime 270b (FIG. 5) equals one 486 (e.g., almost done), then the steps of the geomorph are completed 488 and vertex connectivity adjusted 490 to reflect the edge collapse that required the vertex position manipulations.

If none of these conditions apply, then the parent is visible 478, screen error is acceptable 482, and vmc is not true 480 (i.e., no coarsening is being performed). Therefore, a coarsening geomorph is started 492. Note, however, that this implementation of adapt_refinement( ) does not allow overlapping coarsening gromorphs. (But see FIG. 5 discussion regarding modifying data structures to handle the more complex case of overlapping coarsenings.)

The invention teaches avoiding inefficiencies inherent to progressive mesh rendering systems. In particular, discussion has focused on relieving processor and storage requirements by reducing the number of vertices that are processed during any given block of time (or output frames). Having described and illustrated the principles of our invention with reference to an illustrated embodiment, it will be recognized that the illustrated embodiment can be modified in arrangement and detail without departing from such principles. The programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa, and it should be recognized that the detailed embodiments are illustrative only and should not be taken as limiting the scope of our invention. What is claimed as the invention are all such embodiments as may come within the scope and spirit of the following claims and equivalents thereto.

What is claimed is:

1. A computer-implemented method for computer-generated graphics of an object using a mesh, the mesh representing a multi-dimensional model of the object, the mesh having geometric elements and associated resources encoding attributes of the geometric elements, the method comprising:

producing sequential graphic images depicting a changing view from a viewpoint of the mesh;

evaluating the geometric elements relative to the changing view of the mesh from the viewpoint to determine mesh alterations to be applied to the mesh to effect view-dependent adaptive level of detail adjustment of the mesh, wherein the evaluation of the geometric elements for view-dependent adaptive level of detail adjustment is apportioned over the producing of multiple of the sequential graphic images such that evaluation of the geometric elements is apportioned into multiple non-empty sets of geometric elements and portions having fewer than all geometric elements then present in the mesh are evaluated per graphic image produced; and varying the geometric elements from a first state towards a second state of the mesh after application of a first set of the mesh alterations, wherein the varying the geometric elements also is distributed in time over multiple of the sequential graphic images.

2. The method of claim 1, in which the mesh is rendered into a frame based output format having plural frames, and wherein the evaluating the geometric elements is apportioned over at least two such frames.

3. The method of claim 1, wherein the varying the geometric elements is distributed over multiple time periods of varying duration.

4. The method of claim 1 further comprising overlapping said evaluating geometric elements to determine mesh alterations to effect view-dependent adaptive level of detail adjustment of the mesh and said varying the geometric elements from the first state towards the second state of the mesh.

5. The method of claim 1, wherein the varying geometric elements comprises constructing a first geomorph having the geometric elements variable between the first and second states of the mesh.

6. The method of claim 5 further comprising:
while at an intermediate point in varying the geometric elements from the first state towards the second state using the first geomorph, determining a third state of the mesh after application of a further set of the mesh alterations;
constructing a second geomorph at run-time having the geometric elements variable between the intermediate point between first and second states of the mesh and the third state of the mesh; and
further varying the geometric elements from the intermediate point between first and second states of the mesh toward the third state of the mesh using the second geomorph, with said further varying the geometric elements distributed in time over a further multiple of the sequential graphic images.

7. The method of claim 6, wherein the varying the geometric elements from the first state towards the second state varies at least one of the geometric elements along an initial trajectory between positions of the at least one geometric element at the first and second states, and where the at least one geometric element follows a revised trajectory upon the further varying the geometric elements from the intermediate point towards the third state, such revised trajectory being a combination of the initial trajectory between the first and second states, and a new trajectory between a position of the at least one geometric element at the intermediate point and a position of the at least one geometric element at the third state of the mesh.

8. The method of claim 7 further comprising forming the revised trajectory with a curve fitting algorithm, such algorithm using the positions of the at least one geometric element at the first state, the intermediate point, and the third state as control points.

9. The method of claim 1, in which application of the first set of mesh alterations determines a final position of the geometric elements at the second state of the mesh, and wherein the varying the geometric elements over time further includes:
identifying a first set of vertices of the mesh that are entering a viewing frustum while the view of the mesh from the view point changes, and directly altering such vertices to their final position;
identifying a second set of vertices of the mesh that are leaving the viewing frustum, and directly altering such vertices to their final position; and
identifying a third set of vertices of the mesh that are remaining in the viewing frustum, and altering such vertices by a geomorph operation to their final position.

10. The method of claim 9, in which each vertex has a spatial coordinate representing such vertex's position the mesh, and wherein an ongoing geomorph operation, having plural vertices undergoing vertex split transformations, is modified to split a parent vertex, the split resulting in a first and a second vertex, the method further comprising:
allocating a resource for the first vertex;
assigning to the second vertex the spatial coordinate for the parent vertex;
immediately updating mesh connectivity to reflect the introduction of the first vertex; and
adjusting the spatial coordinate of the first vertex over the predetermined time period, so as to gradually effect the result of the geomorph operation.

11. The method of claim 10, in which the graphic images of the mesh are rendered to an output device having a rendering frame rate, and wherein the geomorph operation is performed in a number of increments equal to the rendering frame rate.

12. The method of claim 10, in which the graphic images of the mesh are rendered to an output device having a frame rate per second, and each geomorphing vertex has a predetermined distance to travel, the method further comprising:
retrieving a complexity estimate for performance of the geomorph operation;
multiplying the rendering frame rate by a multiplier proportional to the complexity estimate, so as to define an adjusted frame rate; and
determining a geomorph increment as the predetermined distance divided by the adjusted frame rate.

13. A computer-readable medium having stored thereon programming code for implementing the method of claim 11.

14. The method of claim 1 wherein the evaluating comprises a multi-stage evaluation of a plurality of geometric elements for a view-dependent adaptive level of detail adjustment of the mesh, and the multi-stage evaluation of the plurality of geometric elements for the view-dependent adaptive level of detail adjustment is apportioned over a plurality of stages during which multiple sequential graphic images are produced.

15. A computer readable medium having data structures stored thereon, the data structures including a plurality of data structure elements for storing a progressive mesh representation of a fully-detailed mesh as a base mesh and a sequence of mesh alteration operations, the data structures for use in a computer graphics imaging system for producing graphics images depicting the mesh, wherein the computer graphics imaging system selectively alters the progressive mesh connectivity according to a changing view of the mesh from a viewpoint to define an active mesh having a selectively refined level of detail, the data structures comprising:
a static vertex-array for encoding all vertices in the progressive mesh;
a static face-array for encoding all faces in the progressive mesh;
a static sequence-array for encoding the sequence of mesh alteration operations; and
a dynamically allocated face-list tracking each face in the active mesh;
whereby the computer graphics imaging system adds and removes the entries in the face list from the list as the mesh connectivity is selectively altered according to the changing view.

16. The computer readable medium of claim 15, wherein the data structures further comprise a dynamically allocated vertex-list for tracking each vertex of the active mesh.

17. The computer readable medium of claim 16, in which the data structures stored thereon further include a vertex data structure for encoding a vertex of the fully-detailed mesh, the vertex data structure comprising:
a first reference referring to a dynamically allocated vertex-configuration data structure, such reference having a valid reference-state and an invalid reference-state;
wherein the first reference has the valid reference-state if the vertex is in the dynamically allocated vertex-list.

18. The computer readable medium of claim 17, in which the valid reference-state is a reference to the dynamically allocated vertex-configuration data structure, the vertex-configuration data structure comprising:

a second reference referring to the dynamically allocated vertex-list;

a back-reference to the vertex data structure referencing the vertex-configuration data structure; and a geometry structure containing geometry data for the vertex.

19. The computer readable medium of claim 18, in which the vertex-configuration data structure further includes a Boolean flag indicating whether the vertex is part of a geomorph operation.

20. The computer readable medium of claim 15, in which the data structures stored thereon further include a face data structure for encoding a face of the progressive mesh, the face data structure comprising:

a first reference to a dynamically allocated face-configuration data structure, such reference having a valid reference-state and an invalid reference-state;

wherein the first reference has the valid reference-state if the face is in the dynamically allocated face-list.

21. The face-configuration data structure of claim 20, in which the valid reference-state is a reference to the dynamically allocated face-configuration data structure, and where each polygon face of the progressive detailed mesh is defined by a plurality of vertices, the face-configuration data structure comprising:

a second reference referring to the dynamically allocated face-list;

a first plurality of references referring to the vertices defining the polygon face; and a second plurality of references, each such reference referring to a neighboring-face for the polygon face within the progressive mesh.

22. The face-configuration data structure of claim 21, wherein each neighboring-face for the polygon face within the progressive mesh and each vertex defining the polygon face are numbered such that a neighboring face j opposes a vertex j across the polygon face.

23. A computer-implemented method for computer graphics imaging based on view-dependent level of detail adjustment of an arbitrary progressive mesh over a predetermined number of time periods, the mesh representing a multi-dimensional model having elements including vertices and associated resources encoding attributes of each vertex, the method comprising:

(a) determining a set of mesh alterations based on changes between a first and a second viewing frustum, such frustum determined according to a view point relative to the progressive mesh;

(b) in a single time period, selecting a proper, nonempty subset of the mesh alterations, and varying positions of the mesh elements according to the proper, nonempty subset of mesh alterations;

(c) repeating step (b) so that all mesh alterations are performed in the predetermined number of time periods; and (d) producing computer graphics images based on the mesh in at least some of the predetermined number of time periods.

24. The method of claim 23, in which all mesh alterations are performed in one second.

25. A computer-implemented method for view-dependent level of detail adjustment of an arbitrary progressive mesh over a predetermined number of time periods for computer graphics, the mesh representing a multi-dimensional model having elements including vertices and associated resources encoding attributes of each vertex, the method comprising:

(a) determining a set of mesh alterations based on changes between a first and a second viewing frustum, such frustum determined according to a view point relative to the progressive mesh;

(b) selecting a proper, nonempty subset of the mesh alterations; and (c) varying positions of the mesh elements according to the proper, nonempty subset of mesh alterations;

(d) overlapping repetition of steps (b) and (c) so that all mesh alterations are performed in the predetermined number of time periods; and (e) producing computer graphics images based on the mesh in at least some of the predetermined number of time periods.

26. A method of distributing geometry processing of vertices of a mesh over a predetermined number of time periods for computer graphics, the mesh representing a multi-dimensional model having elements including vertices and associated resources encoding attributes of each vertex, the method comprising:

(a) determining a set of mesh alterations for X vertices based on changes between a first and a second viewing frustum, such frustum determined according to a view point relative to the progressive mesh;

(b) in a single time period, selecting a proper, nonempty subset of the mesh alterations for Y vertices, where Y is less than X, and adjusting over time the positions of the Y vertices according to the proper, nonempty subset of mesh alterations; and (c) repeating step (b) until all vertices have been adjusted in the predetermined number of time periods; and (d) producing computer graphics images based on the mesh in at least some of the predetermined number of time periods.

27. A computer-implemented method for view-dependent level of detail adjustment of an arbiter mesh for computer graphics, the mesh representing a multi-dimensional model having elements including vertices, the method comprising;

(a) in a single time period, traversing a portion of a list of active vertices, where the portion is less than all but at least one vertex in the list;

(b) for each vertex in the portion, evaluating whether to refine or to coarsen the vertex; and (c) repeating steps (a) and (b) in subsequent time periods for successive portions of the list; and (d) producing computer graphics images based on the mesh in at least some of the predetermined number of time periods.

28. A computer-implemented method for view-dependent level of detail adjustment of an arbitrary progressive mesh for computer graphics, the mesh representing a multi-dimensional model having elements including vertices, the method comprising;

(a) in a single time period, traversing a portion of a front across the progressive mesh, the front identifying a set of vertices of the progressive mesh, and the portion having fewer vertices than the front and at least one vertex;

(b) for each vertex in the portion, evaluating whether to refine or to coarsen the vertex; and (c) repeating steps (a) and (b) in subsequent time periods for successive portions of the front; and (d) producing computer graphics images based on the mesh in at least some of the predetermined number of time periods.

29. A computer-readable medium having stored thereon programming code for implementing a method for computer-generated graphics imaging of an object using a mesh, the mesh representing a multi-dimensional model of the object, the mesh having geometric elements and associated resources encoding attributes of the geometric elements, the method comprising:

producing sequential graphic images depicting a changing view from a viewpoint of the mesh;

evaluating the geometric elements relative to the changing view of the mesh from the viewpoint to determine mesh alterations to be applied to the mesh to effect view-dependent adaptive level of detail adjustment of the mesh, wherein the evaluation of the geometric elements for view-dependent adaptive level of detail adjustment is apportioned into multiple nonempty sets over the producing of multiple of the sequential graphic images such that portions having fewer than all geometric elements then present in the mesh are evaluated per graphic image produced; and varying the geometric elements from a first state towards a second state of the mesh after application of a first set of the mesh alterations, wherein the varying the geometric elements also is distributed in time over multiple of the sequential graphic images.

* * * * *

UNITED STATES PATENT AND TRADEMARK OFFICE
CERTIFICATE OF CORRECTION

PATENT NO. : 6,426,750 B1
DATED : July 30, 2002
INVENTOR(S) : Hoppe

It is certified that error appears in the above-identified patent and that said Letters Patent is hereby corrected as shown below:

Title page,
Item [56], OTHER PUBLICATIONS, for the "Kalvin" reference, "2-3" should read -- 2-13 --.

Column 1,
Line 59, "refinements" should read -- refinement --.
Line 62, "first" should read -- first. --.

Column 11,
Line 2, "from exceeds" should read -- exceeds --.
Line 67, "structure" should read -- structure --.

Column 12,
Line 4, "Vie" should read -- $V_u$. --.
Line 23, "$M^n$]." should read -- $M^n$.) --.
Line 32, "our" should read -- out --.
Line 59, "Listotode" should read -- ListNode --.
Line 60, "269b" should read -- 268b --.

Column 14,
Line 19, "vsplit I ecol" should read -- vsplit/ecol --.
Line 34, "$vsplit_1$" should read -- $vsplit_i$ --.
Line 44, "be also be" should read -- also be --.

Column 15,
Line 19, "is level" should read -- level --.
Line 45, "(ecot)" should read -- (ecol) --.

Column 16,
Line 61, "choose reduce" should read -- choose to reduce --.

Column 17,
Line 65, "he" should read -- the --.

Column 18,
Line 49, "reduce" should read -- reduced --.

UNITED STATES PATENT AND TRADEMARK OFFICE
CERTIFICATE OF CORRECTION

PATENT NO. : 6,426,750 B1
DATED : July 30, 2002
INVENTOR(S) : Hoppe

It is certified that error appears in the above-identified patent and that said Letters Patent is hereby corrected as shown below:

Column 21,
Line 55, "the mesh" should read -- within the mesh --.

Column 24,
Line 40, "arbiter" should read -- arbitrary --.

Signed and Sealed this

Eighteenth Day of March, 2003

JAMES E. ROGAN
*Director of the United States Patent and Trademark Office*